United States Patent
Tidwell et al.

(10) Patent No.: US 7,620,160 B2
(45) Date of Patent: Nov. 17, 2009

(54) ANNOUNCING PRESENCE INFORMATION DURING TELEPHONE CALL RINGBACK

(75) Inventors: Paul D. Tidwell, Sammamish, WA (US); Timothy M. Moore, Bellevue, WA (US); Warren Vincent Barkley, Mill Creek, WA (US)

(73) Assignee: Microsoft Corporation, Redmond, WA (US)

( * ) Notice: Subject to any disclaimer, the term of this patent is extended or adjusted under 35 U.S.C. 154(b) by 640 days.

(21) Appl. No.: 11/176,005

(22) Filed: Jul. 5, 2005

(65) Prior Publication Data

US 2007/0025530 A1    Feb. 1, 2007

(51) Int. Cl.
*H04M 1/64* (2006.01)

(52) U.S. Cl. ............ 379/88.25; 379/88.22; 379/207.16; 379/386; 455/414.1; 455/433

(58) Field of Classification Search ............ 379/142.01, 379/142.07, 88.22, 88.25, 207.16, 386; 704/270.1; 455/414, 433
See application file for complete search history.

(56) References Cited

U.S. PATENT DOCUMENTS

| | | | | |
|---|---|---|---|---|
| 5,321,740 | A | * | 6/1994 | Gregorek et al. ......... 379/88.22 |
| 6,374,102 | B1 | | 4/2002 | Brachman et al. |
| 6,606,505 | B1 | | 8/2003 | Chow et al. |
| 7,006,608 | B2 | * | 2/2006 | Seelig et al. ............. 379/88.22 |
| 7,127,400 | B2 | * | 10/2006 | Koch ........................ 704/270.1 |
| 7,171,200 | B2 | * | 1/2007 | No et al. ...................... 455/433 |
| 7,180,991 | B2 | * | 2/2007 | Dhara et al. ........... 379/142.01 |
| 7,203,294 | B2 | * | 4/2007 | Carnazza et al. ....... 379/142.07 |
| 7,227,929 | B2 | * | 6/2007 | Seelig et al. ............... 379/67.1 |
| 2002/0128000 | A1 | * | 9/2002 | do Nascimento, Jr. ...... 455/414 |
| 2005/0190789 | A1 | | 9/2005 | Salkini et al. |

FOREIGN PATENT DOCUMENTS

| | | |
|---|---|---|
| WO | WO98/48559 | 10/1998 |
| WO | WO2005/004451 | 1/2005 |

OTHER PUBLICATIONS

Convedia, "Personalized Ringback Tones," Copyright 2004 Convedia Corporation (2 pages).
International Search Report for International Patent Application No. PCT/US06/25681, Feb. 28, 2007.

* cited by examiner

*Primary Examiner*—Gerald Gauthier
(74) *Attorney, Agent, or Firm*—Perkins Coie LLP

(57) ABSTRACT

A method and system for outputting a call announcement based on presence information of a callee as a ringback tone is provided. The announcement system is provided with presence information of users. When the telephone system receives an indication of an incoming call from a caller, the telephone system identifies the callee. After the callee is identified, the announcement system retrieves the presence information for the callee and generates an announcement based on that presence information.

15 Claims, 8 Drawing Sheets

ANNOUNCING PRESENCE INFORMATION DURING TELEPHONE CALL RINGBACK

BACKGROUND

When a telephone call is placed, the caller has traditionally been supplied with an intermittent ringing sound signaling that the call has not yet been connected to the called party or callee. When the callee answers the call, the intermittent ringing sound is stopped and the callee is connected to the caller. The period from when the call is placed to when the call is answered is often referred to as the "call ringback." The intermittent ringing sound is referred to as the "ringback tone."

Various telephone service providers have recently started to allow their customers to pick the ringback tone that the customers want their callers to hear. One telephone service provider allows its customers to select a custom ringback tone from hundreds of musical clips. For example, one customer may select a clip of a Mozart symphony while another customer may select a clip of a rock 'n roll group.

Although the placing of a telephone call is a common form of real-time conversations, another common form of real-time conversations is instant messaging. An instant messaging service allows participants at endpoints to send messages and have them received within a second or two by the other participants in the conversation. The receiving participants can then send responsive messages to the other participants in a similar manner. To be effective, a real-time conversation relies on the participants' becoming aware of, reviewing, and responding to received messages very quickly. This quick response is in contrast to conventional electronic mail systems in which the recipients of electronic mail messages respond to messages at their convenience.

When an initiating participant wants to start a real-time conversation, that participant would typically like to know whether the intended participants are available to respond in real time to a message. If not, then communications via conventional electronic mail, voicemail, or some other mechanism may be more appropriate. For example, if the computers of the intended participants are currently powered off, then a real-time conversation may not be possible. Moreover, if their computers are currently powered on, but the intended participants are away from their computers, a real-time conversation is also not possible. The initiating participant would like to know the availability of the intended participants so that an appropriate decision on the form of communication can be made.

The availability status of an entity such as a computer system (i.e., endpoint) or a user associated with that computer system is referred to as "presence information." Presence information identifies the current "presence state" of the user. Users make their presence information available so that other users can decide how best to communicate with them. For example, the presence information may indicate whether a user is logged on ("online") with an instant messaging server or is logged off ("offline"). Presence information may also provide more detailed information about the availability of the user. For example, even though a user is online, that user may be away from their computer in a meeting. In such a case, the presence state may indicate "online" and "in a meeting."

In an instant messaging context, a publishing user ("publisher") may provide their presence information to a presence server that then provides the presence information to subscribing users ("subscribers"). Thus, a presence server may use a subscriber/publisher model to provide the presence information for the users of a presence server. Whenever the presence information of a user changes, the presence server is notified of the change by that user's computer system and in turn notifies the subscribing users of the change. A subscribing user can then decide whether to initiate an instant messaging conversation based on the presence information of the intended participants. For example, if the presence information indicates that a publishing user is currently in a conference telephone call, then the subscribing user may decide to send an instant message, rather than place a telephone call, to the publishing user. If the subscribing user, however, needs to call and speak with the publishing user, the subscribing user needs to monitor the presence information of the publishing user to know when the call can be placed. When the subscribing user notices that the publishing user's presence information indicates that the telephone conference has been concluded, the subscribing user can then place the telephone call.

SUMMARY

A method and system for outputting a call announcement based on presence information of a callee as a ringback tone is provided. The announcement system is provided with presence information of users. When the telephone system receives an indication of an incoming call from a caller, the telephone system identifies the callee. After the callee is identified, the announcement system retrieves the presence information for the callee and generates an announcement based on that presence information. Thus, the announcement system can provide an announcement as a ringback tone that is based on the presence information of a callee.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
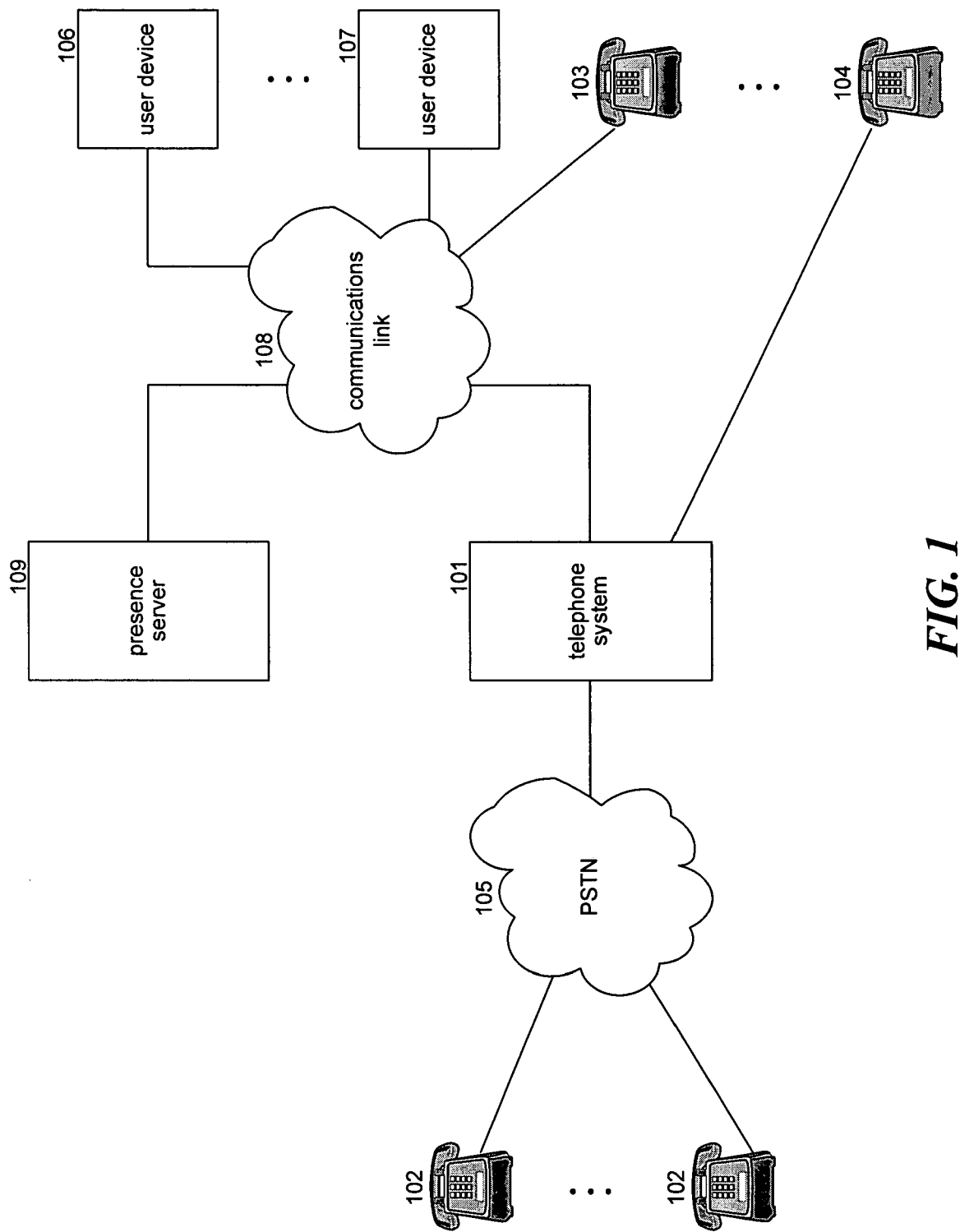
FIG. 1 is a block diagram that illustrates the use of presence information by a telephone system to customize ringback tones in one embodiment.

A method and system for outputting a call announcement based on presence information of a callee as a ringback tone is provided. In one embodiment, the announcement system is provided with presence information of users. At initialization, the announcement system may subscribe to the presence information of its users. Alternatively, the announcement system may query a presence system when the presence information of a user is needed, rather than subscribing to presence information. When the announcement system receives an indication of an incoming call from a caller, the announcement system identifies the callee. For example, when the call is a voice over IP ("VoIP") call, the announcement system may identify the callee from metadata associated with the call. When the call is via the public switched telephone network ("PSTN"), the announcement system may identify the callee from a mapping of telephone numbers to users. The presence information of each user may include the telephone numbers of that user. After the callee is identified, the announcement system retrieves the presence information for the callee and generates an announcement based on that presence information. For example, the announcement based on the presence information may report the availability status of the callee, may suggest when the callee will be available based on calendar information, may be a recording by the callee, and so on. The announcement system then effects the playback of the announcement as a ringback tone to provide the caller with the presence information of the callee before the call is answered. In this way, the announcement system can provide to the caller the presence information of a callee before the call is answered.

In one embodiment, the announcement system may allow pre-announcement and post-announcement processing to be customized based on the presence information. As a pre-announcement example, a user may indicate in their presence information that calls to the user are to be automatically forwarded to a voicemail system or to be forwarded to the user without outputting an announcement. As a post-announcement example, a user may indicate that, after the announcement is output, the call should be terminated or forwarded to a voicemail system. The customization of the announcement and the pre-announcement and post-announcement processing can be controlled by the user. For example, a user may specify in their presence information that the announcement should include suggestions on when the user may become available for a telephone call. The announcement system may make the suggestions based on analysis of the calendar information of the user. For example, if the availability status of the user indicates that the user is currently in a meeting and the user's calendar indicates that the meeting will be complete in 30 minutes, then the announcement may suggest that the caller call back in 30 minutes. The announcement system may further allow the user to customize the announcement based on the identification of the caller. For example, the announcement for certain callers may include detailed presence information such as that the callee is currently in a meeting at a certain location and may provide the callee's cell phone number. In contrast, the announcement for all other callers, including those that cannot be identified, may simply indicate that the user is busy. The announcement system may provide a rule-based system for allowing a user to specify rules for how to play announcements as ringback tones for incoming calls. The announcement system may cause the announcement to be played only in certain circumstances and normal ring tone be played otherwise. For example, a user may specify that an announcement should be played only when the user is busy. When the callee answers the call, the announcement system may terminate the announcement so that the caller and callee can start talking.

FIG. 1 is a block diagram that illustrates the use of presence information by a telephone system to customize ringback tones in one embodiment. The telephone system 101, which includes the announcement system, is connected to various telephones 102, 103, and 104. Telephones 102 are connected to the telephone system via the PSTN 105. Telephone 103 is connected to the telephone system via communications link 108 (e.g., the Internet) using VoIP. Telephone 104 is connected directly to the telephone system. User devices 106 and 107 are connected to the presence server 109 via communications link 108. The user devices may include personal computers, cellular phones, personal digital assistants, and so on. The user devices may also connect to the telephone system and be capable of placing and receiving telephone calls. The user devices register the presence information of their users with the presence server. When the presence information of the user changes, the user's device notifies the presence server of the change. The telephone system subscribes to the presence information of the users that is provided by the presence server. When the presence information of the user changes, the presence server notifies the telephone system. When the telephone system receives an incoming call, such as from telephone 102, it identifies the cal lee and retrieves the presence information for the callee. The telephone system then generates an announcement based on the callee's presence information and outputs that announcement to the caller as a ringback tone. The telephone system may forward the call to the callee's telephone either before or after the announcement is output. The announcement system may be installed at various locations within a telephone system. For example, the announcement system may be installed at central offices, enterprise telephony systems, private branch exchanges, and so on. The announcement system may subscribe to presence information provided by various different presence service providers. The presence information may include availability status, calendaring information, recorded announcements, customized rules for generating the announcements, and so on. In one embodiment, the announcement system may retrieve information from sources other than the presence server. For example, the announcement system may retrieve calendar information from a calendar subsystem of an electronic mail system, rules from a rules server, and so on.

Figure 2:
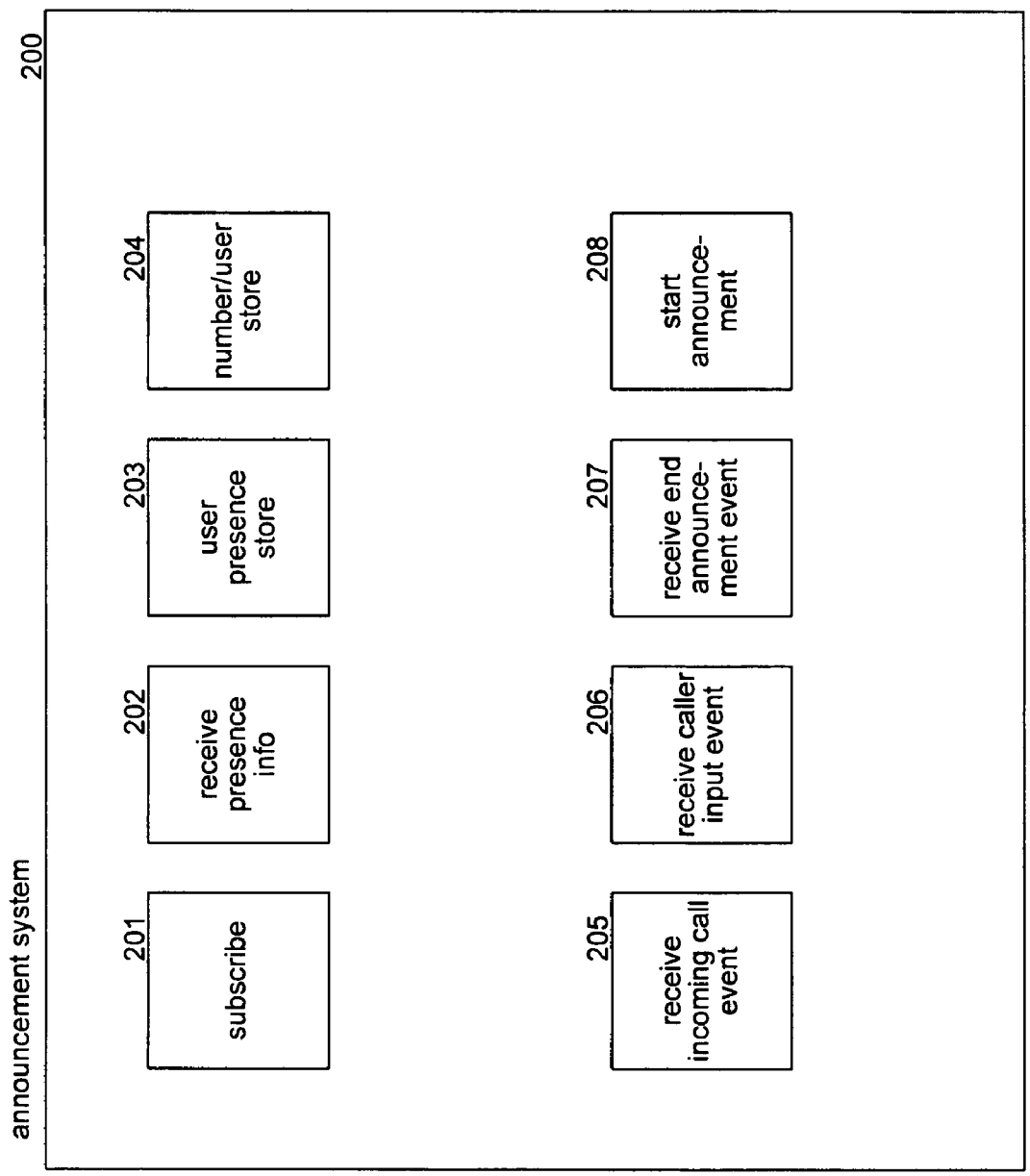
FIG. 2 is a block diagram that illustrates components of the announcement system in one embodiment.

FIG. 2 is a block diagram that illustrates components of the announcement system in one embodiment. The announcement system 200 includes a subscribe component 201, a receive presence information component 202, a user presence store 203, and a number/user store 204. The number/user store provides a mapping of telephone numbers to their corresponding users. For example, the telephone number 571-555-0001 may be mapped to user John Smith, and the telephone number 571-555-0002 may be mapped to user Tom Jones. The announcement system may be preconfigured with the number-user store or may be derived from the presence information of the users. The number/user store may be dynamically updated as new users are added or telephone numbers of existing users change. The user presence store contains an entry for each user. Each entry contains the presence information for that user. The subscribe component is invoked to subscribe to the presence information of the users. The subscribe component selects each user with an entry in the user presence store and sends a subscription request to the presence server for that user. The receive presence information component receives from the presence server updates to the presence information of the subscribed-to users and updates the user presence store accordingly. The announcement system also includes a receive incoming call event component 205, a receive caller input event component 206, a receive end announcement event component 207, and a start announcement component 208. The receive incoming call event component is invoked when the telephone system receives an incoming telephone call. The component invokes the start announcement component to control the generating of the announcement and the outputting of the generated announcement as the ringback tone. The receive caller input event component is invoked when the caller input is received, such as a selection of a button on the telephone. The announcement system may process the incoming call based in part on the caller input. For example, if the caller inputs a priority code, then the announcement system may forward the call to the callee with a priority ring so that the callee can identify the call as a priority call. If the call has already been forwarded to the callee, then the announcement system may change the ring pattern to indicate a priority call. The announcement system may place the caller immediately into voicemail, may terminate the announcement, and so on based on the caller input. As another example, the announcement system may allow the caller to schedule a telephone call with the callee based on the caller input. In such an embodiment, the announcement system may have access to the calendar of the callee. The receive end announcement event component is invoked when the output of the announcement has been completed. The component may forward the call to the callee, may terminate the call, or perform other processing.

The computing device on which the announcement system is implemented may include a central processing unit, memory, input devices (e.g., keyboard and pointing devices), output devices (e.g., display devices), and storage devices (e.g., disk drives). The memory and storage devices are computer-readable media that may contain instructions that implement the announcement system. In addition, the data structures and message structures may be stored or transmitted via a data transmission medium. Various communications links may be used, such as the Internet, a local area network, a wide area network, a point-to-point dial-up connection, a cell phone network, and so on.

Embodiments of the announcement system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The user devices may be cell phones, personal digital assistants, smart phones, personal computers, programmable consumer electronics, digital cameras, and so on. Telephones may be conventional telephones, VoIP telephones, cell phones, telephone integrated with personal digital assistants, smart phones, and so on.

The announcement system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
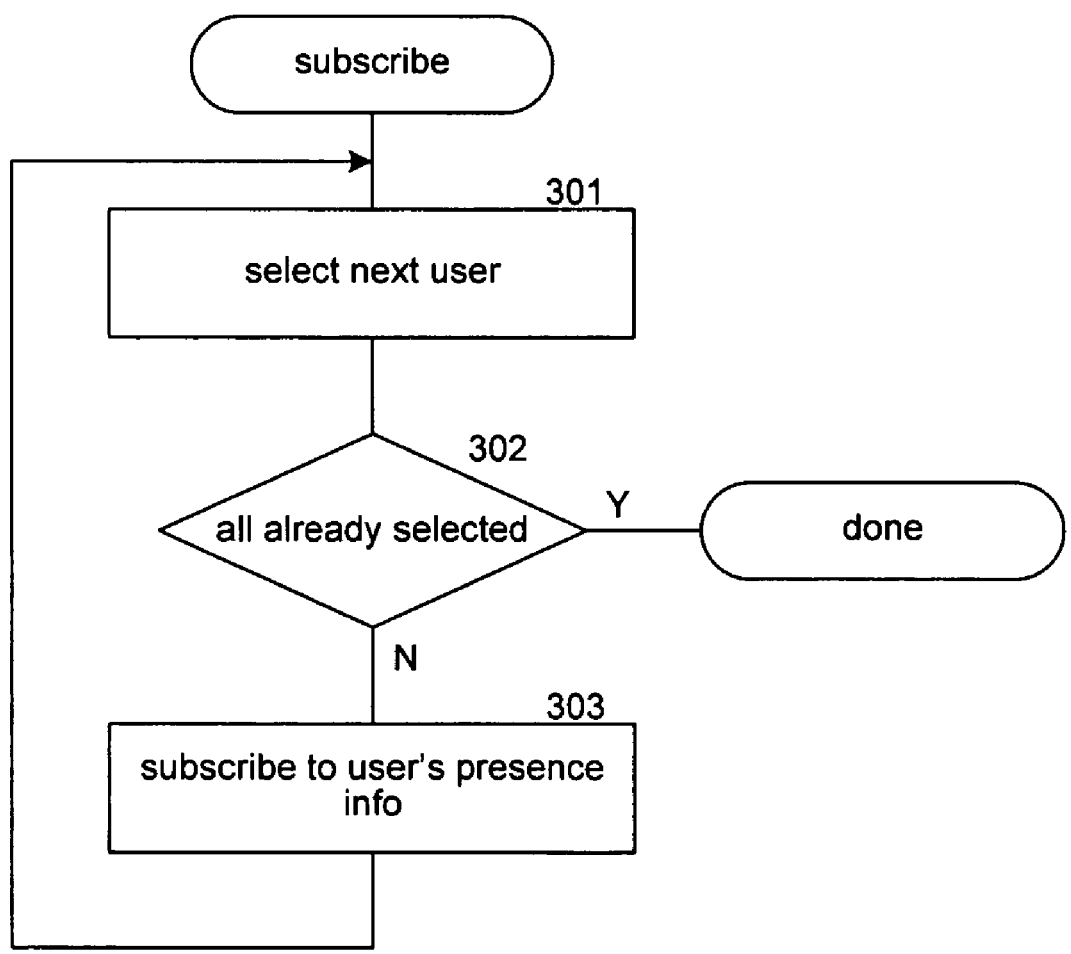
FIG. 3 is a flow diagram that illustrates the processing of the subscribe component in one embodiment.

FIG. 3 is a flow diagram that illustrates the processing of the subscribe component in one embodiment. The subscribe component selects each entry from the user presence store and subscribes to the presence information of that user. When the user registered with the presence server, the presence server may have published a mapping of the user to that presence server with a location service. The component can access the location service to identify the presence server for each user. In block 301, the component selects the next user from the user presence store. In decision block 302, if all the users have already been selected, the component completes, else the component continues in block 303. In block 303, the component sends a subscription request to the presence server to subscribe to the presence information of the selected user. The component then loops to block 301 to select the next user. The announcement system may also periodically re-subscribe to the presence information of users and subscribe to new users as they are identified to the announcement system. Alternatively, the announcement system may not subscribe to the presence information of a user who may call, but rather submit a query to a presence server only after a call is received from that user.

Figure 4:
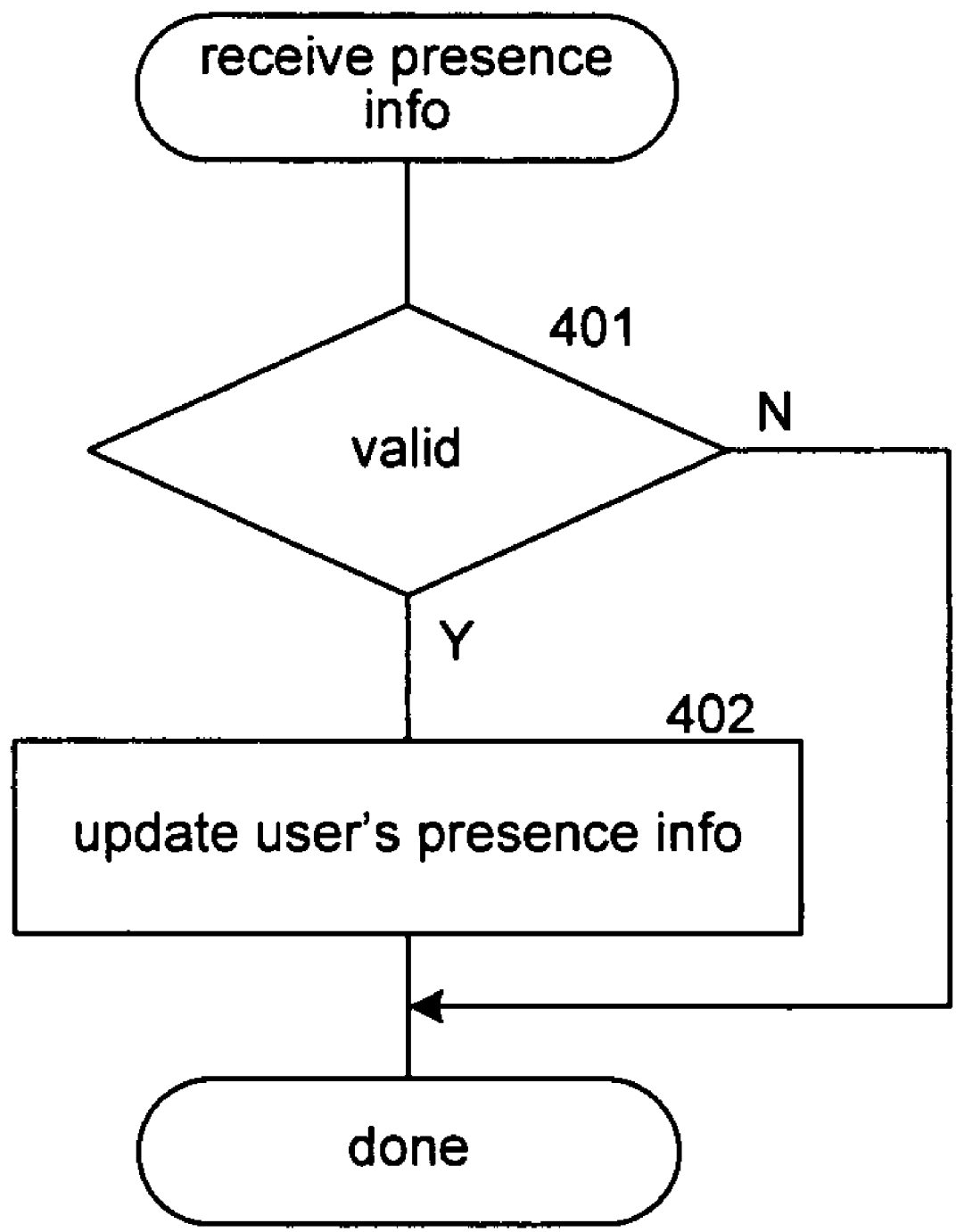
FIG. 4 is a flow diagram that illustrates the processing of the receive presence information component in one embodiment.

FIG. 4 is a flow diagram that illustrates the processing of the receive presence information component in one embodiment. The component is invoked whenever the announcement system receives a notification of an update to a user's presence information. In decision block 401, if the receive notification is for a valid user to which the announcement system has subscribed, then the component continues at block 402, else the component completes. In block 402, the component updates the presence information of the user in the user presence store and completes.

Figure 5:
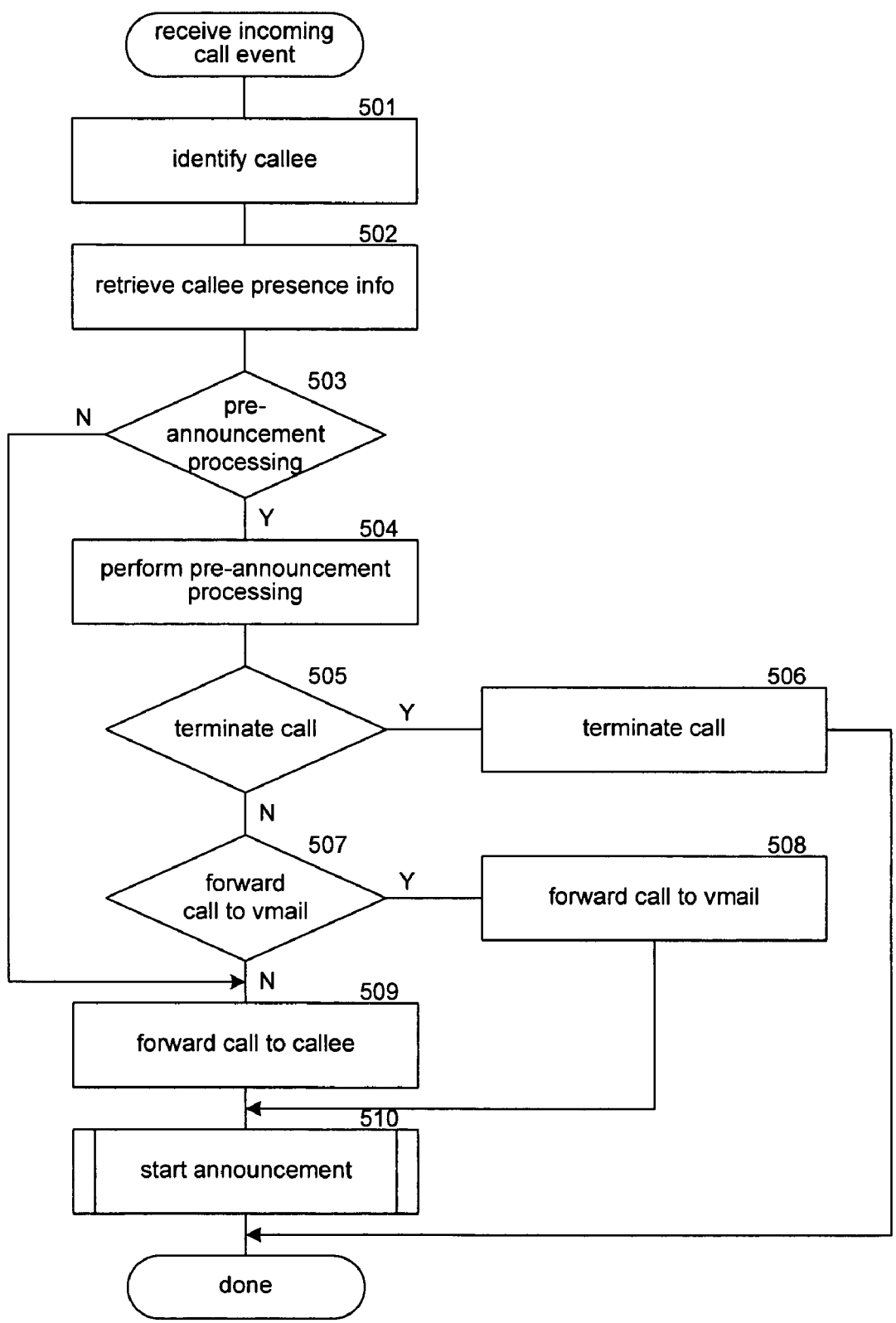
FIG. 5 is a flow diagram that illustrates the processing of the receive incoming call event component of the announcement system in one embodiment.

FIG. 5 is a flow diagram that illustrates the processing of the receive incoming call event component of the announcement system in one embodiment. The component is invoked when the telephone system receives an incoming call event. The component may be passed the telephone number of the callee. In block 501, the component retrieves the identification of the callee from the number/user store. Alternatively, the component may retrieve the identification of the callee from metadata associated with the incoming call. In block 502, the component retrieves the presence information of the callee. In decision block 503, if the presence information indicates to perform pre-announcement processing, then the component continues at block 504, else the component continues at block 509. In block 504, the component performs the pre-announcement processing for the callee. For example, the callee may have specified certain conditions (e.g., based on the identity of the caller) upon which the call should be automatically terminated without outputting any announcement. In blocks 505-508, the component processes the call based on the results of the pre-announcement processing. In decision block 505, if the pre-announcement processing indicates to terminate the call, then the component terminates the call in block 506 and then completes, else the component continues at block 507. In decision block 507, if the pre-announcement processing indicates to forward the call to voicemail, then the component forwards the call to voicemail in block 508 and then continues at block 510, else the component continues at block 509. In block 509, the component forwards the call to the callee. In block 510, the component invokes the start announcement component to output the announcement so that it is played while the call is ringing the callee or being forwarded to voice mail and then completes.

Figure 6:
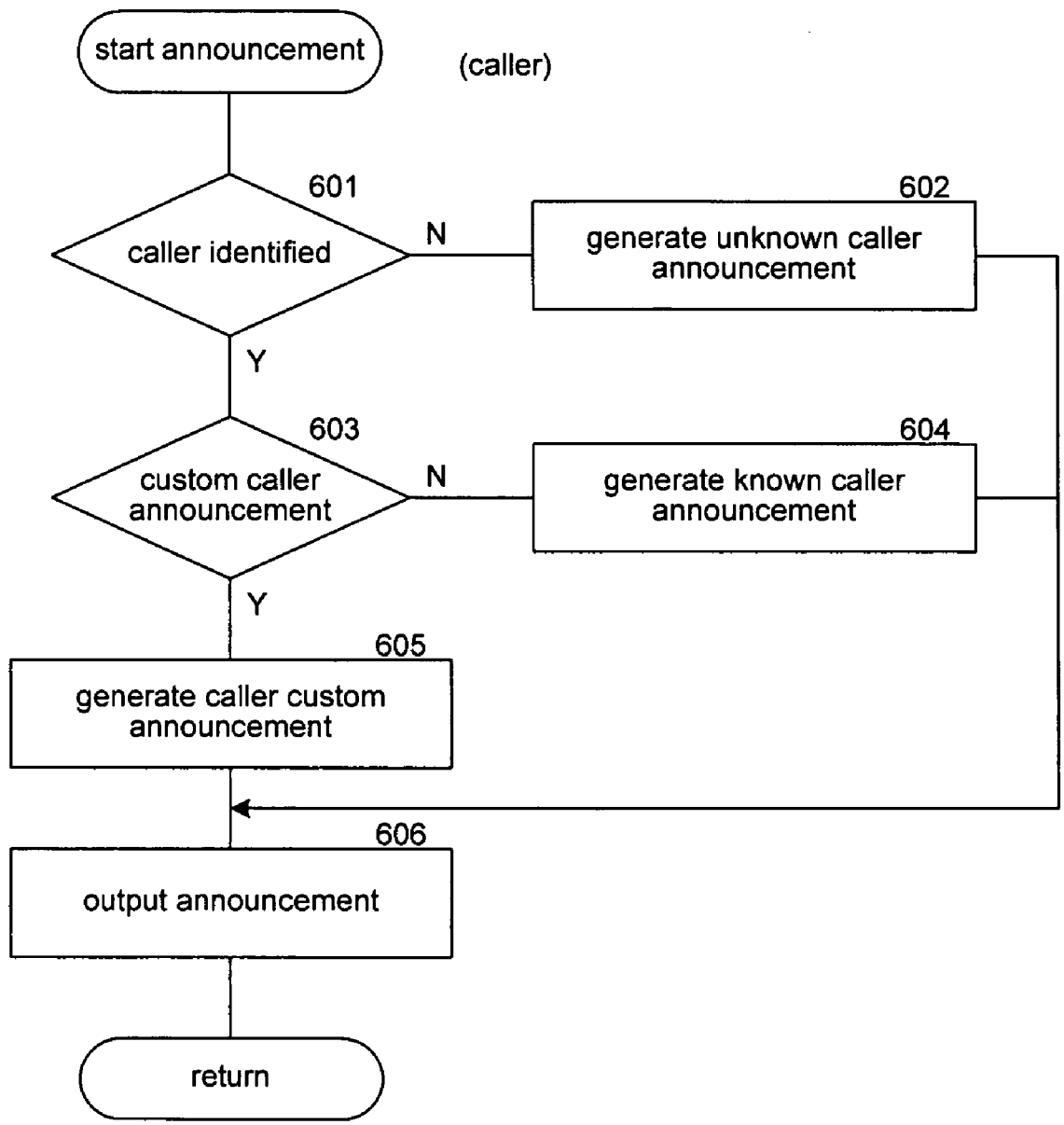
FIG. 6 is a flow diagram that illustrates the processing of the start announcement component of the announcement system in one embodiment.

FIG. 6 is a flow diagram that illustrates the processing of the start announcement component of the announcement system in one embodiment. The component is passed the presence information of the callee, generates the announcements based on the presence information, and outputs the generated announcement. The presence information may include an announcement type field that is specified by the callee. The announcement type may indicate that the announcement should be recorded by the callee, generated automatically from calendar information, generated as a default, and so forth. In decision block 601, if the caller has been identified (e.g., from caller id information), then the component continues at block 603, else the component continues at block 602. In block 602, the component generates an announcement for unknown callers that may factor in the announcement type and then continues at block 606. In decision block 603, if the presence information indicates to generate a custom announcement for the caller, then the component continues at block 605, else the component continues at block 604. In block 605, the component generates an announcement for a known caller and continues at block 606. For example, the announcement may thank the caller by name and confirm that the call is being forwarded to the callee. In block 605, the component generates an announcement customized to the caller that may factor in announcement type. For example, if the callee is not currently available, the component may retrieve the calendar information for the callee and the caller and suggest when to schedule a call. In block 606, the component starts the output of the generated announcement and then completes.

Figure 7:
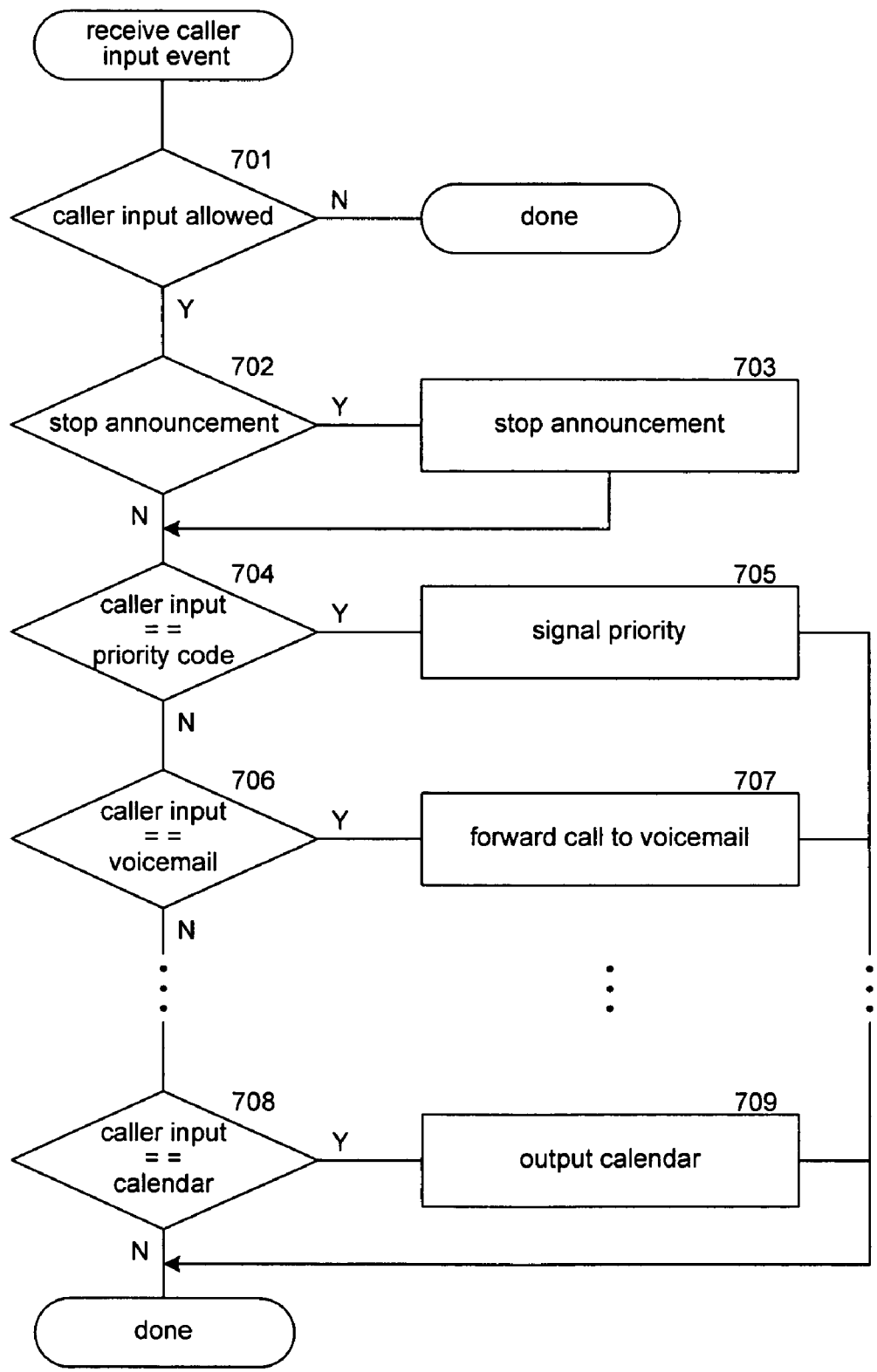
FIG. 7 is a flow diagram that illustrates the processing of the receive caller input event component of the announcement system in one embodiment.

FIG. 7 is a flow diagram that illustrates the processing of the receive caller input event component of the announcement system in one embodiment. The component is invoked when input from the caller is received. The caller may input information using buttons of the telephone, speaking commands or numbers, and so on. In decision block 701, if input from the caller is allowed, then the component continues at block 702, else the component discards the input and then completes. The decision on whether caller input is allowed may be based on the identity of the caller, the identity of the callee, rules within the presence information, and so on. In decision block 702, if the user input indicates to stop the announcement, then the component stops the announcement in block 703. The component may stop the announcement for various reasons such as the caller requested the announcement to be stopped, the caller requested to be put immediately into voicemail, and so on. In decision block 704, if the caller input indicates a priority code, then the component continues at block 705, else the component continues at block 706. Each user may have an associated priority code. A user may provide their priority code to others so that they may place priority calls to the user. For example, a salesperson may give their priority code to a customer so that calls from the customer to the salesperson may indicate that it is a priority call. In block 705, the component forwards the call to the callee with a priority indication such as a priority ring or some other indication of priority. The component then completes. In decision block 706, if the caller input indicates that the call should be place immediately into voicemail, then the component continues at block 707, else the component continues at block 708. In block 707, the component forwards the call to the voicemail system and then completes. In decision block 708, if the caller input indicates the caller wants to review calendar information of the callee, then the component continues at block 709, else the component completes. In block 709, the component generates a message based on the calendar information and outputs the message. Subsequent caller inputs may be used to move through the calendar information, schedule a telephone conference, and so forth. The component then completes.

Figure 8:
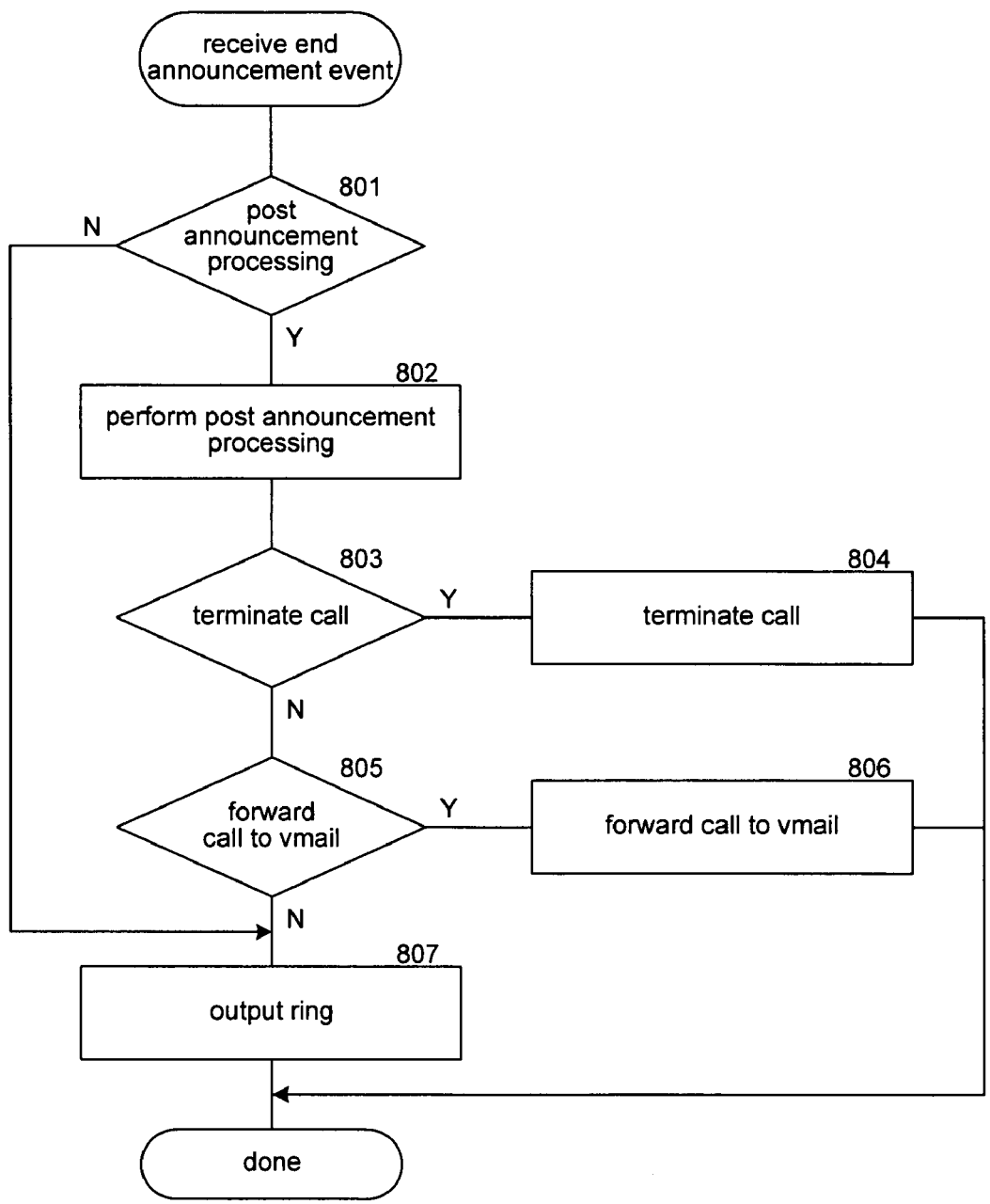
FIG. 8 is a flow diagram that illustrates the processing of the receive end announcement event component of the announcement system in one embodiment.

FIG. 8 is a flow diagram that illustrates the processing of the receive end announcement event component of the announcement system in one embodiment. The component is invoked when the output of an announcement ends. The component performs any post-announcement processing. In decision block 801, if post-announcement processing is to be performed, then the component continues at block 802, else the component continues at block 807. In block 802, the component performs the post-announcement processing which may indicate how to handle the call. For example, the post-announcement processing may indicate to terminate the call or to forward the call to voicemail. In decision block 803, if the post-announcement processing indicates to terminate the call, then the component terminates the call in block 804 and completes, else the component continues at block 805. In decision block 805, if the post-announcement processing indicates to forward the call to voicemail, then the component forwards the voicemail in block 806. In block 807, the component may output a ring at the completion of the announcement until the call is answered. The component then completes.

From the foregoing, it will be appreciated that specific embodiments of the announcement system have been described herein for purposes of illustration, but that various modifications may be made without deviating from the spirit and scope of the invention. Accordingly, the invention is not limited except as by the appended claims.

We claim:

1. A computer-readable medium containing instructions for controlling a computer system to provide a ringback tone by a method comprising:
    subscribing with a presence server to receive presence information of users, the presence information of a user including a mapping of a telephone number to the user;
    receiving from the presence server notifications of changes to the presence information of the users as the presence server is updated with the presence information of the users and storing the presence information of the users as indicated by the notifications;
    receiving an indication of an incoming call from a caller to a telephone number;
    identifying a called user from the called telephone number using the mapping of users to telephone numbers of the stored presence information;
    retrieving from the stored presence information presence information for the called user identified from the called telephone number, the presence information including availability of the called user; and
    before the incoming call is answered, outputting to the caller a ringback tone indicating the availability of the called user
    wherein the ringback tone indicating the availability of the called user is output before the call is answered so that the caller knows the availability of the called user before the call is answered.

2. The computer-readable medium of claim 1 including forwarding the call to the called user before outputting the ringback tone.

3. The computer-readable medium of claim 1 including after the output of the ringback tone has been completed, forwarding the call to the called user wherein a second ringback tone is output after the call is forwarded.

4. The computer-readable medium of claim 1 including performing pre-ringback tone processing before outputting the ringback tone and post-ringback tone processing after outputting the ringback tone based on the retrieved presence information.

5. The computer-readable medium of claim 1 including receiving input from the caller during the output of the ringback tone and processing the call in accordance with the input from the caller.

6. A method for controlling computing device to provide a ringback tone, the method comprising:
    subscribing by the computing device with a presence server to receive presence information of users, the presence information of a user including a mapping of a telephone number to the user;

receiving from the presence server notifications of changes to the presence information of the users as the presence server is updated with the presence information of the users and storing the presence information of the users as indicated by the notifications;

receiving an indication of an incoming call from a caller to a telephone number;

identifying by the computing device a called user from the called telephone number using the mapping of users to telephone numbers of the stored presence information;

retrieving by the computing device from the stored presence information presence information for the called user identified from the called telephone number, the presence information including availability of the called user; and before the incoming call is answered, outputting to the caller a ringback tone indicating the availability of the called user wherein the ringback tone indicating the availability of the called user is output before the call is answered so that the caller knows the availability of the called user before the call is answered.

7. The method of claim 6 including forwarding the call to the called user before outputting the ringback tone.

8. The method of claim 6 including after the output of the ringback tone has been completed, forwarding the call to the called user wherein a second ringback tone is output after the call is forwarded.

9. The method of claim 6 including performing pre-ringback tone processing before outputting the ringback tone and post-ringback tone processing after outputting the ringback tone based on the retrieved presence information.

10. The method of claim 6 including receiving input from the caller during the output of the ringback tone and processing the call in accordance with the input from the caller.

11. A computing device for providing a ringback tone comprising:
    a processor; and
    a memory encoded with computer-executable instructions for
        subscribing with a presence server to receive presence information of users, the presence information of a user including a mapping of a telephone number to the user;
        receiving from the presence server notifications of changes to the presence information of the users as the presence server is updated with the presence information of the users and storing the presence information of the users as indicated by the notifications;
        receiving an indication of an incoming call from a caller to a telephone number;
        identifying a called user from the called telephone number using the mapping of users to telephone numbers of the stored presence information;
        retrieving from the stored presence information presence information for the called user identified from the called telephone number, the presence information including availability of the called user; and
        before the incoming call is answered, outputting to the caller a ringback tone indicating the availability of the called user
        wherein the ringback tone indicating the availability of the called user is output before the call is answered so that the caller knows the availability of the called user before the call is answered.

12. The computing device of claim 11 wherein the memory is further encoded with computer-executable instructions for forwarding the call to the called user before outputting the ring back tone.

13. The computing device of claim 11 wherein the memory is further encoded with computer-executable instructions for after the output of the ringback tone has been completed, forwarding the call to the called user wherein a second ringback tone is output after the call is forwarded.

14. The computing device of claim 11 wherein the memory is further encoded with computer-executable instructions for performing pre-ringback tone processing before outputting the ringback tone and post-ringback tone processing after outputting the ringback tone based on the retrieved presence information.

15. The computing device of claim 11 wherein the memory is further encoded with computer-executable instructions for receiving input from the caller during the output of the ringback tone and processing the call in accordance with the input from the caller.

* * * * *

UNITED STATES PATENT AND TRADEMARK OFFICE
CERTIFICATE OF CORRECTION

PATENT NO. : 7,620,160 B2  Page 1 of 1
APPLICATION NO. : 11/176005
DATED : November 17, 2009
INVENTOR(S) : Tidwell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 971 days.

Signed and Sealed this

Twenty-sixth Day of October, 2010

David J. Kappos
*Director of the United States Patent and Trademark Office*